Nov. 9, 1954     B. J. HAWKINS     2,693,646
EDUCATIONAL DEVICE
Filed Feb. 11, 1952     4 Sheets-Sheet 1
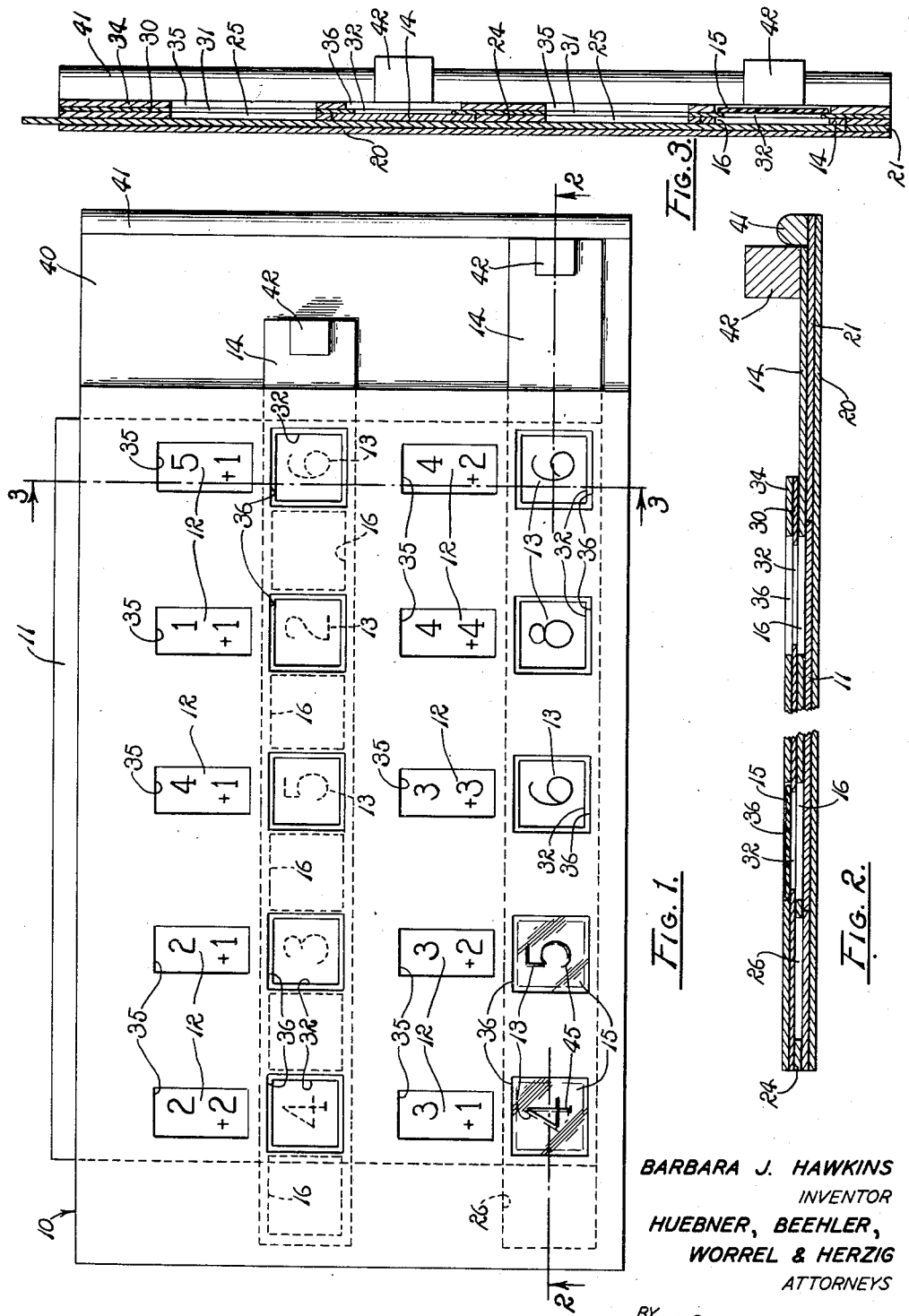
BARBARA J. HAWKINS
INVENTOR
HUEBNER, BEEHLER,
WORREL & HERZIG
ATTORNEYS Nov. 9, 1954 — B. J. HAWKINS — 2,693,646
EDUCATIONAL DEVICE
Filed Feb. 11, 1952 — 4 Sheets-Sheet 2
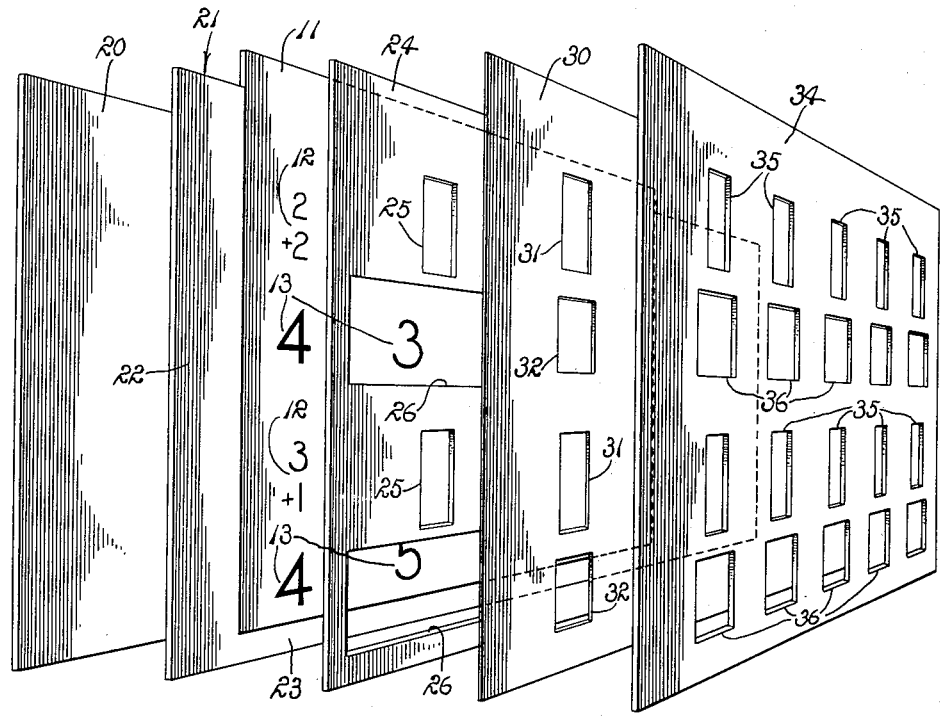
Fig. 4.
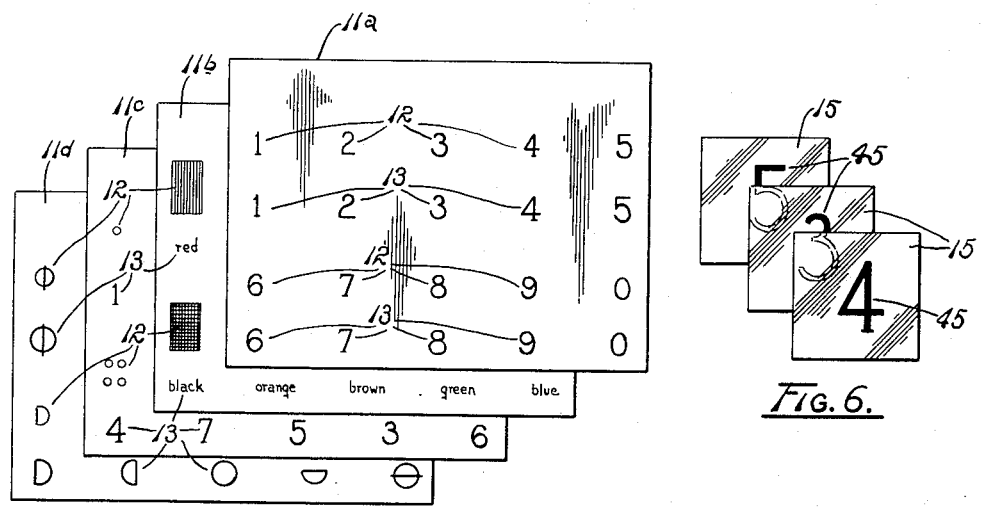
Fig. 5.
Fig. 6.
BARBARA J. HAWKINS
INVENTOR
HUEBNER, BEEHLER,
WORREL & HERZIG
ATTORNEYS Nov. 9, 1954   B. J. HAWKINS   2,693,646
EDUCATIONAL DEVICE
Filed Feb. 11, 1952   4 Sheets-Sheet 3
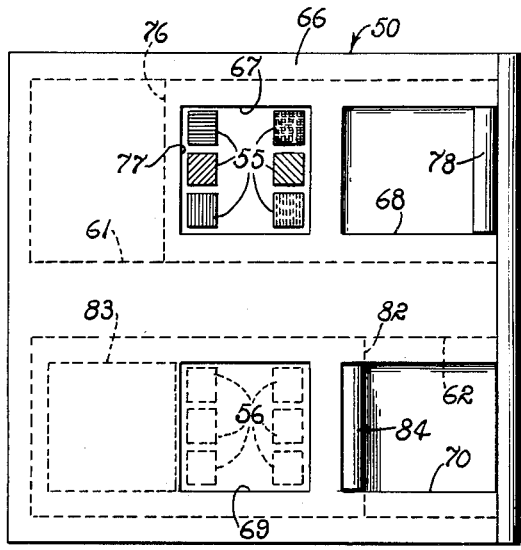
FIG. 7.
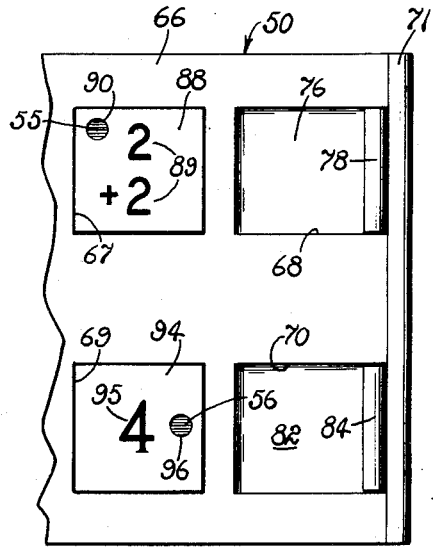
FIG. 8.
FIG. 9.
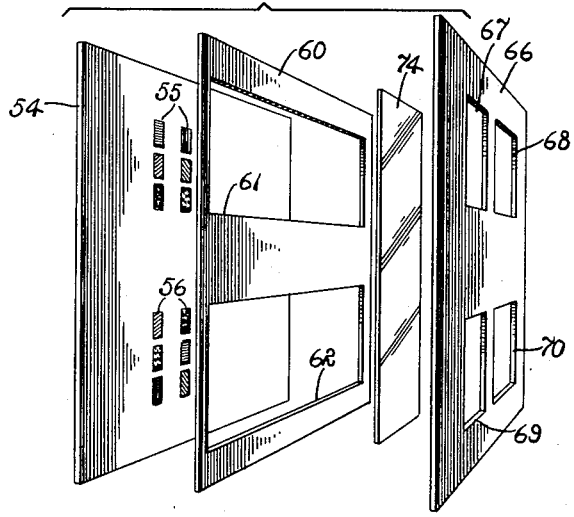
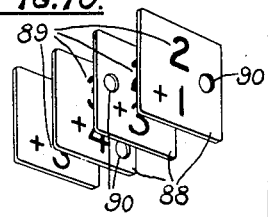
FIG. 10.
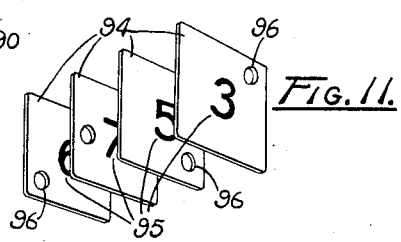
FIG. 11.
BARBARA J. HAWKINS
INVENTOR
HUEBNER, BEEHLER,
WORREL, & HERZIG
ATTORNEYS
BY Richard M. Horrel Nov. 9, 1954  B. J. HAWKINS  2,693,646
EDUCATIONAL DEVICE
Filed Feb. 11, 1952  4 Sheets-Sheet 4

BARBARA J. HAWKINS
INVENTOR
HUEBNER, BEEHLER,
WORREL, & HERZIG
ATTORNEYS

United States Patent Office 2,693,646
Patented Nov. 9, 1954

2,693,646

EDUCATIONAL DEVICE

Barbara J. Hawkins, Fresno, Calif.

Application February 11, 1952, Serial No. 271,027

14 Claims. (Cl. 35—9)

The present invention relates to educational devices and more particularly to an educational game adapted to present a variety of predetermined problems to a student, to permit the student to register his reactions to the problems, and to enable the student through simple manipulation of the device to check the accuracy of the answers registered so that proper memory bonds may be strengthened and inappropriate responses readily detected and eliminated.

Improvements in teaching techniques have resulted in the development of a number of educational games whose principal objective has been to secure student interest in the performance of learning exercises selected to develop a skill or to impart a knowledge desired. The subject invention relates to this general class of educational games but seeks to overcome certain problems encountered and to provide needed improvements.

An object of the present invention is to facilitate the instruction of children in arithmetic, spelling, color identification, reading, writing, and other skills in which the principles of matching can be utilized to verify student response.

Another object is to provide an improved educational game directed to the attainment of student interest in learning exercises to be performed.

Another object is to provide an educational game adapted to self-teaching repetition of learning exercises and student verification of the accuracy of exercise performance.

Another object is to provide a device of the character described in which problems and answers are visually presented in such close proximity that they are visible as an entity or unitary pattern conducive to the establishment of an accurate memory bond between the problem and the proper answer or solution.

Another object is to provide an educational device that is simple to construct and adapted to fabrication from abundant economical materials such as cardboard, fiberboard, sheet plastic material, and the like.

Another object is to provide an educational device posing selective problems and answers having corresponding color indicia appearing in correlation on proper selection of answers to problems.

Another object is to provide an educational board presenting problems of placement of indicia in sequence.

Further objects and advantages will become apparent in the subsequent description in the specification.

Referring to the drawings:

Fig. 1 is a front elevation of an educational device embodying the principles of the present invention.

Fig. 2 is a foreshortened longitudinal section of the device taken on line 2—2 of Fig. 1.

Fig. 3 is a transverse section of the device taken on line 3—3 of Fig. 1.

Fig. 4 is an exploded view of the device shown in Fig. 1 illustrating the elements employed therein and their ordered arrangement.

Fig. 5 is an elevational view of a collection of problem cards suitable for use in the device of the present invention illustrating a variety of simple problems and their answers.

Fig. 6 is a somewhat enlarged elevational view of suitable student answer registering panels utilized in the subject device.

Fig. 7 is a front elevation of a second form of the invention employing checking means constituting color indicia appearing through problem and answer windows.

Fig. 8 is a fragmentary front elevation of the second form of the invention illustrating problem and answer cards in corresponding windows having identical color indicia appearing through openings in the cards indicating proper student response.

Fig. 9 is an exploded perspective of the second form illustrating the correlation of members of the device.

Fig. 10 is a perspective of a plurality of problem panels used in the second form.

Fig. 11 is a perspective of a plurality of answer panels employed with the second form.

Figure 12:
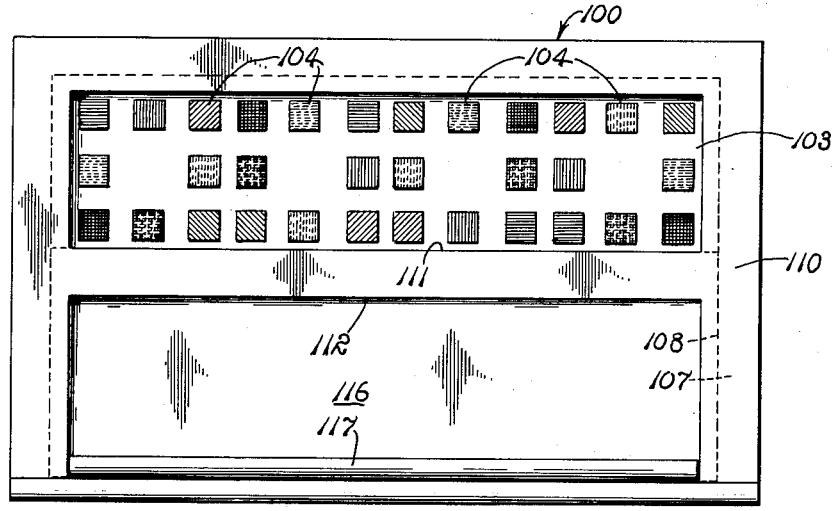
Fig. 12 is a front elevation of a third form of the invention employing sequence color indicia appearing through an answer window therein.

Referring in greater detail to the drawings:

The device of the present invention preferably employs a holding member 10 adapted individually to receive any of a plurality of problem cards 11 with problem indicia 12 thereon visible to the student and answer indicia 13 indicated in proximity to the problem indicia initially hidden by opaque shields 14 slidably mounted in covering relation to the answer indicia of the problem cards.

Transparent student answer indicating panels 15 are receivable in the holding member 10 in superimposed relation to the shields 14 and in juxtaposition to the answer indicia hidden by the shields. With a problem card 11 in position, as shown in Fig. 1, a student observes the problem indicia 12 and selects answer indicating panels 15 which he deems appropriate and positions such panels in the holding member adjacent to the problem indicia. This operation is performed with the shields in covering relation to the answer indicia on the problem cards.

As will subsequently be described in greater detail, the shields provide answer windows 16 therein so that once the student has registered his answers by the positioning of the panels 15, the shields 14 are moved to align the answer window 16 with the answer indicia 13 of the problem card permitting the student to verify his answers by visual inspection of the answer indicia through the transparent panels. This not only provides the student with an opportunity for practicing a learning exercise but personally to verify his answers so that faulty memory bonds can promptly be corrected. The proper answer indicia 13 is provided in such near proximity to the problem indicia 12 that a single visual impression is made of the problem and appropriate answer conducive to rapid learning.

As shown in Fig. 4, the holding member 10 is assembled from a substantially rectangular base panel 20 of cardboard, fiberboard, sheet plastic material, or the like. A first spacer panel 21 conveniently congruent to the base panel is positioned on the base panel. The first spacer panel provides opposite end strips 22 and a side strip 23 defining a channel transversely of the base panel to which the problem cards 11 are slidably fitted.

A second rectangular spacer panel 24 is superimposed on the first spacer panel 21 and has a plurality of problem windows 25 formed therein in positions adapted to coincide with the problem indicia 12 of problem cards 11 slidably positioned in the channel of the first spacer panel. The second spacer panel 24 has shield channels 26 formed longitudinally therein adjacent to the problem windows and positioned to register with the answer indicia of the problem cards positioned in the channel of the first spacer panel. The shield channels 26 extend to an end of the second spacer panel and are transversely related to the problem card channel of the first spacer panel.

A third rectangular spacer panel 30 is superimposed on the second spacer panel and has formed therein problem windows 31 aligned with the problem windows 25 of the second spacer panel 24 and answer windows 32 in registry with the shield channels 26 and in alignment with the answer indicia 13 of the problem cards 11 inserted into the holding member 10.

A rectangular cover panel 34 is superimposed on the third spacer panel 30 and has problem windows 35 aligned with the problem windows 25 and 31. The cover panel also has answer windows 36 aligned with the answer windows 32 appreciably larger than said answer windows 32 to define receptacles for the answer registering panels 15. Said answer panels 15 are fitted to the answer windows 36 of the cover panel 34 and are conveniently rested on the circumscribing margin of the third spacer panel about the answer windows 32.

The base panel 20, first spacer panel 21, second spacer panel 24, third spacer panel 30, and cover panel 34 are held in assembled relation by gluing or stapling the same in the described stacked relation. It will be apparent that the panels constitute laminations of the holding member 10 which may also be secured in any suitable manner.

As evident in Fig. 1, a problem card 11 is slidably positioned in the channel of the first spacer panel and the shields 14 slidably positioned in the channels of the second spacer panel 24 in overlaying relation to the answer indicia 13. The base panel 20 and the first spacer panel 21 are preferably endwardly extended from the ends of the second spacer panel 24, third spacer panel 30, and cover panel 34, as indicated at 40. A molding or roll 41 is mounted or formed transversely on the endward extension 40 and constitutes a stop for the shields 14. For convenience in manipulating the shields, wooden blocks 42 may be provided on the ends of the shields intermediate the ends of the base panel and first spacer panel and the superimposed panels.

The problem cards 11 may provide any desired type of problem indicia 12 and appropriate answer indicia 13. As shown in Figs. 1 and 4, the problem indicia may conveniently take the form of numbers which are to be added, substracted, multiplied, or divided and the answer indicia 13 the appropriate numerical result. As shown at 11a in Fig. 5, the problem indicia may simply constitute a number which the student is supposed to match. In this event the answer indicia and the problem indicia are identical. Obviously, this type of problem card is suitable for use by very young students such as those found in the lower primary grades.

To test color recognition and/or reading, a problem card such as that shown at 11b may be utilized having as the problem indicia vairous colored areas and for the answer indicia the name of the colors.

11c illustrates a problem card in which the problem indicia 12 takes the form of one or more grouped circles or other units which the student is supposed to count. The corresponding answer indicia 13 takes the form of the numeral indicating the number of units in the adjacent problem indicia.

11d illustrates a problem card in which the problem indicia 12 is a geometrical shape which the student is supposed to match. In this instance, the answer indicia is merely a repetition of the problem indicia. The problem cards shown only partially suggest the breadth of application of the subject educational device to a multitude of learning exercises. A great number of additional problems and answers will occur to anyone utilizing the device of the subject invention.

In Fig. 6, a plurality of transparent answer indicating panels 15 are illustrated. The panels each bear a numeral or other answer indicating means 45. The panels are provided in random order and the student required to select from the group the appropriate responses to the problems posed by the problem cards 11. It will be obvious that when the problem cards 11b or 11d are utilized, appropriate panels must be provided. When desired, plain transparent panels may be provided on which the student writes or draws what he considers to be the appropriate answers.

Operation

The operation of the device of the present invention is believed to be clearly apparent and is briefly summarized at this point. A problem card 11 is inserted into the holding member 10 so that the problem indicia 12 are visible through the problem windows 25, 31, and 35. The shields 14 are longitudinally positioned in the second spacer panel 24 to conceal the answer indicia 13. The student is provided with a plurality of answer indicating panels 15 from which he selects the desired panels for insertion in the answer windows 36. When the student has answered all of the problems posed by the problem card 11, or a predetermined period has elapsed, the student slides the shields 14 so that the windows 16 therein permit visual inspection of the answer indicia 13. The student compares the answer 45 on the panels 15 directly with the answer indicia 13 by visual inspection of the answer indicia through the transparent panels. Any errors that have been made are promptly detected and the panels 15 removed where in error and the correct panels substituted therefor.

For a successive learning exercise or test, the shields 14 are returned to their initial position concealing the answer indicia 13. The problem card 11 is withdrawn from the holding member 10 and a new problem card inserted. The answer indicating panels 15 are all removed from the holding member and the same or an appropriate new set of answer indicating panels made available in random order. As before, the student selects the panels 15 he considers appropriate to the problems posed and inserts them in the answer windows 36. The students response is verified as before by sliding the shields for visual inspection of the answer indicia through the answer windows 36, 32, and 16.

Second form

Although the panels 15 have been described as preferably formed of transparent sheet material, it will be obvious that certain departures may be made therefrom under the practice of the present invention. It is only necessary that each of the answer panels permit visual inspection of a small portion of a problem card for answer verifying purposes. Such verification may be permitted by forming a small opening or series of openings through answer panels. Verification is achieved by indicating the proper answer on the problm card in a position for inspection through such an opening or series of openings or instead of setting forth the proper answer per se on the problem card, the opening or series of openings in each answer panel may be located in an arrangement individual to their particular panel so as to coincide by a similarly positioned dot or series of dots on the problem card. In such event, the student can quickly verify the accuracy of a selected answer panel by visually determining if the openings in the panels are all registered with their proper dots on the problem card.

A second form of the invention, illustrated in Figs. 7 to 11, inclusively, is adapted to indicate by matching colors proper student response. The second form of the device includes a holding member 50 of rectangular shape and of laminated form. A rearmost lamination of the holding member is identified as a base panel 54 of rectangular sheet form having a pattern of colored problem indicia areas 55 and an adjacent pattern of colored answer indicia areas 56. The patterns of both the problem and the answer indicia are identical but with like colors in unlike positions in the two patterns so that a student or player cannot be guided in answering a problem by the location of a problem color relative to its corresponding answer color. The hatching in Figs. 7, 8 and 9 indicate various colors of the indicia and an exemplary location of the various colors in the pattern.

A rectangular spacer panel 60 substantially equal in size to the base panel 54 is superimposed on the base panel. A problem shield channel 61 and an answer shield channel 62 are formed through the spacer panel. The channels are conveniently rectangular in shape and located in transversely adjacent relation.

A rectangular cover panel 66 of sheet material, substantially congruent to the base panel 54 and the spacer panel 60, is located on the spacer panel with the panels 54, 60 and 66 secured into an integral unit by gluing therebetween or by stapling through the laminate panels. A rectangular problem window 67 and a rectangular knob opening 68 are formed through the cover panel in lateral alignment symmetrically of the problem shield channel 61 with the plurality of colored problem indicia appearing through the problem window 67. A rectangular answer window 69 and a rectangular knob opening 70 are pierced through the cover panel in lateral alignment symmetrically of the answer shield channel 62 with the plurality of colored answer indicia visible through the answer window 69. For handling convenience, a molding 71 is mounted along the right edge, as viewed, of the holding member 50.

The colored indicia 55 and 56 are covered and protected by a transparent window 74 interposed between the spacer panel 60 and the cover panel 66 and secured therebetween in covering relation to the problem window 67 and the answer window 69.

An elongated wooden molding 75 is secured along the right hand edge, as viewed, of the holding member. A problem shield 76 of elongated rectangular sheet material is slidably positioned in the problem shield channel 61 having a rectangular problem window 77, congruent to the problem window 67, formed near one end thereof. A wooden knob or bead 78 is attached along the opposite end of the problem shield extending upwardly through the knob opening 68 for manual sliding of the shield selectively to position either a solid opaque portion of the shield or the problem window 77 over the colored problem indicia 55.

An answer shield 82 of rectangular sheet material is slidably located in the answer shield channel 62. A rectangular answer window 83, dimensioned similarly to the answer window 69, is formed through the answer shield near its left end thereof, as viewed. An elongated knob or bead 84 is mounted along the opposite end of the answer shield and extends upwardly through the knob opening 70 for manual positioning of the answer shield. The answer shield is slidably positionable to register either the answer window 83 or an imperforate portion of the shield with the answer window 69.

With the problem shield 76 positioned with an imperforate portion thereof over the problem indicia 55, a student or participant may locate a problem panel 88 into the problem window 77 onto the transparent window 74. A plurality of problem panels are provided each made of opaque sheet material fitted to the problem window 67 in the cover panel. Each problem panel is provided with problem indicia or data 89 posing a problem of predetermined character suited to an instructional objective. A checking key window 90 is pierced through each problem panel so that one of the colored problem indicia 55 will appear therethrough when the problem shield is slid toward the molding 75 with the answer window 69 in the shield registering with the answer window 83 in the cover panel. It will be apparent that each key opening will be precisely positioned in its respective problem panel at a location individually characteristic thereof.

With the answer shield slidably located with an imperforate portion thereof over the answer indicia 56, the student is expected to select and to locate an appropriate answer indicating panel 94 in the answer window 83 in the cover panel in rested position on the transparent window 74. A plurality of the answer panels are provided, individually fitted to the answer window 69 and each having answer indicia or data 95 printed or otherwise appearing thereon. The answer indicia 95 provide answers for each of the problems indicated on the problem panels 88. An answer confirming opening 96 is pierced through each answer panel 94 in a position individual thereto so that the student may clearly observe the accuracy of his registered response. To check his response, the problem shield 76 and the answer shield 82 are slid toward the molding 70 and with the windows 77 and 83 in the shields revealing the colored indicia 55 and 56, identical colors should appear through the color opening 90 in the selected problem panel 88 and through the color opening 96 in the answer panel. If the colors do not match, the response has been inaccurate.

*Third form*

Figure 13:
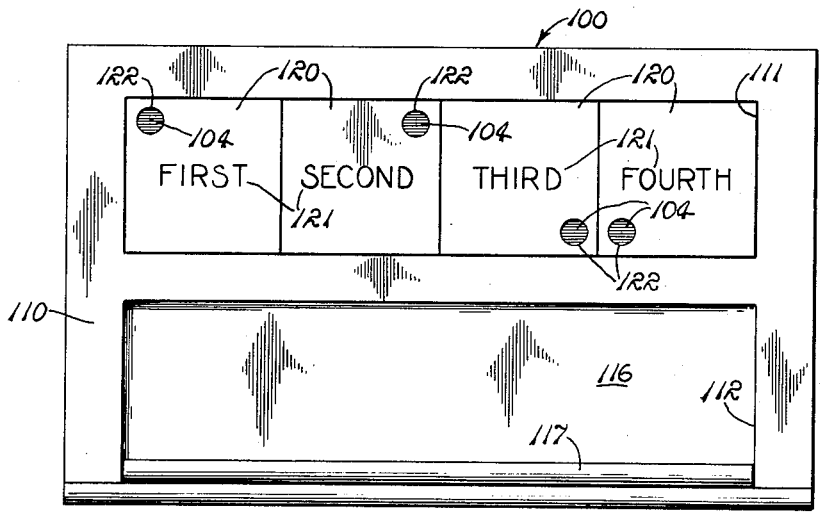
Fig. 13 is a view similar to Fig. 12 showing sequence answer panels in proper order in the answer window of the device.

A third form of the invention is illustrated in Figs. 12 and 13 of the drawings having a holding member 100 somewhat similar to the holding members 10 and 50. The holding member 100 is laminate, one lamination of which is a base panel 103 of rectangular sheet form having sets of colored sequence indicia 104 thereon with the sets in lateral alignment. Each set of colored indicia is provided with identical colors but in different locations in the sets.

A rectangular spacer panel 107 is located over the base panel and has a rectangular shield channel 108 formed therethrough, with its longitudinal dimension transversely of the spacer panel. The sets of colored sequence indicia are visible through an upper portion of the channel.

A cover panel 110 of rectangular sheet form is provided with a rectangular answer window 111 juxtapositioned between the sequence indicia on the upper portion of the shield channel and a knob opening 112 formed therethrough. The cover panel 110, the rectangular spacer panel 107 and the base panel 103 are secured together forming the holding member 100.

A rectangular shield 116 is slidably mounted in the shield channel 108 between the base panel and the cover panel movable to two extreme positions, upwardly to cover the sets of colored sequence indicia and downwardly to uncover the indicia. A knob 117 secured along the lower edge of the shield 116 provides for convenient manual positioning of the shield.

Sequence answer panels 120 are provided in sets with each set being equal in number to the number of sets of colored sequence indicia 104 and as a group fitted to the answer window 111. Each set of sequence answer panels are printed or otherwise provided with pictures or other indicia indicating a well known rhyme, tale or other sequential matter. Check openings 122 are pierced through each answer panel in such locations that when a set of answer panels are located over the color sequence indicia in proper sequential order, the identical color appears through the check openings.

*Operation of second and third forms*

The operation of the second and third forms of the invention is quite similar to the operation of the first form of the invention. In the second form both the problem shield 76 and the answer shield 82 are slid to the left, as viewed, causing an imperforate portion of each to cover their respective colored indicia 55 and 56. The student selects any one of the problem panels and places it in the problem window 67 in the cover panel. The student next selects an answer panel 94 with what he believes to be the proper answer thereon and places it in the answer window 69 in the cover panel. By grasping the knobs 78 and 84, the problem shield 78 and the answer shield 82 are slid to the right registering the problem window 77 with the problem window 67 and the answer window 83 with the answer window 69. In so doing, colored indicia will appear through both color openings 90 and 96. If the colors are different, the answer does not correspond with the problem but if the colors are identical, proper response has been made to the problem.

In the operation of the third form of the invention, the shield 116 is moved upwardly by grasping the knob 117 to cover the sequence indicia 104. With the sequence indicia hidden, the student attempts to place a set of answer panels 120 in the answer window 111 in logical sequence. The shield 116 is thereafter downwardly retracted. If the colors appearing through the color openings 122 are not identical, the answer panels are not in proper sequence, but if the colors are identical, then the student has placed the panels in their intended sequence.

The devices of the present invention are economical to produce and are conveniently fabricated from cardboard, fiberboard, opaque plastic sheet material, or the like except for the panels 15 which are required to be of transparent sheet material such as plastic or glass.

The educational devices have the interest motivating characteristics of a game, are adapted to a wide range of learning exercises and student interests. Repetitious practice of learning exercises is facilitated and the practice of errors minimized by the provision of prompt and convenient answer verification.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an educational device of the character described, the combination of a panel having problem indicia and appropriate answer checking indicia visually represented thereon, means mounted in overlaying relation on the panel having a window therein in registry with the answer checking indicia on the panel and having a channel therein extended transversely of the window between the window and the panel, an opaque shield slidably mounted in the channel for reciprocal movement between a position between the window and the checking indicia in overlaying relation to the checking indicia and a position retracted therefrom, and a plurality of selective answer indicating panels having answer indicating indicia visually represented thereon individually selectively insertable into the answer window, the answer checking indicia on the panel being visible through the answer panels upon retraction of the shield and being hidden by movement of the shield between the window and the answer checking indicia.

2. In an educational device, the combination of a first panel having problem indicia and appropriate answer checking indicia visually represented thereon, a spacer panel mounted in overlaying relation on the first panel having an elongated channel formed therein transversely of the answer checking indicia on the first panel, an opaque shield mounted in the channel of the spacer panel for reciprocal movement between a position in overlaying relation to the answer checking indicia on the first panel and a position retracted therefrom, a cover panel mounted in overlaying relation to the spacer panel having a window therein in juxtaposition to the answer checking indicia on the first panel through which the checking indicia is visible when the shield is retracted, and a plurality of answer panels individually selectively insertable into the window in the cover panel through which visual reference to the checking indicia on the first panel can be made when the shield is retracted having student answer registering indicia visually represented thereon.

3. In an educational device, the combination of a problem card having a problem and its answer indicated thereon, answer concealing means removably mounted in covering relation to the answer on the problem card, and transparent student answer indicating means selectively superimposable on the concealing means in juxtaposition to the answers on the problem card.

4. An educational device comprising a problem card having indicated on a face thereof a succession of sets of related indicia each suggestive of a problem and answer indicia individual to each set and appropriate to the problem suggested thereby, answer concealing means removably mounted in covering relation to the answers on the problem card, and transparent student answer indicating means selectively superimposable in covering relation to the concealing means in juxtaposition to the answers on the problem card whereby student answers indicated while the answers on the problem card are hidden by the concealing means may be verified with the answers on the problem card by removal of the concealing means.

5. An educational device comprising a body member having a problem window and an answer window formed therein, a problem card channel formed therein transversely of the windows, and an answer concealing shield channel formed therein transversely of the answer window adjacent to the problem card channel and transversely thereof; a problem card slidably mounted in the channel therefor having a problem indicated thereon in registry with the problem window and an answer indicated thereon in registry with the answer window; an opaque shield slidably mounted in the channel therefor in covering relation to the answer on the problem card; and transparent student answer indicating means selectively superimposable on the body member in covering relation to the answer window.

6. An educational device comprising a problem card having indicated on a face thereof a succession of sets of related indicia each suggestive of a problem and each accompanied adjacent thereto by an answer appropriate to the problem suggested, a plurality of transparent panels in random order bearing answers appropriate to the answers suggested by the sets of indicia on the problem card, an opaque answer shield, and means for releasably receiving the answer panels in positions aligned with the answers on the problem card and removably mounting the answer shield intermediate the answer panels and the answers on the problem card.

7. An educational device comprising a substantially rectangular base panel of sheet material, a first spacer panel mounted on the base panel and having a channel formed therein, a second spacer panel mounted on the first spacer panel having problem windows formed therein in registry with the channel of the first spacer panel and having an elongated channel formed therein transversely of the channel of the first spacer panel, a cover panel positioned on the second spacer panel having problem windows in registry with the problem windows of the second spaced panel and answer windows adjacent to the problem windows in registry with the channel of the second spaced panel, a plurality of problem cards individually slidably receivable in the channel of the first spacer panel having problems designated thereon registerable with the problem windows and answers adjacent thereto registerable with the answer windows, an opaque answer shield slidably mounted in the channel of the second spacer panel for reciprocal movement longitudinally thereof positionable in covering relation to the answer on the problem card and having answer windows formed therethrough positionable in registration with the answer windows in the cover panel, and transparent student answer indicating means selectively positionable on the cover panel in covering relation to the answer windows.

8. An educational device of sheet material comprising a rectangular base panel, a spacer panel mounted on the base panel having portions extended along each end and a side of the base panel defining a channel transversely of the base panel from an edge thereof, a second spacer panel mounted on the first spacer panel having problem windows formed therethrough in registration with the channel of the first spacer member and having an elongated panel formed longitudinally thereof adjacent to the problem windows transversely of the channel in the first spacer panel, a cover channel mounted on the second spacer panel having problem windows formed therein in registration with the problem windows of the second spacer panel and answer windows adjacent to the problem windows in registration with the channel formed in the second spacer panel, a plurality of problem cards individually slidably fitted to the channel in the first spacer panel having problems indicated thereon registerable with the problem windows and appropriate answers indicated adjacent to the problems registerable with the answer windows in the cover panel, an answer shield slidably fitted in the channel of the second spacer panel having answer windows formed therethrough reciprocally positionable selectively to cover the answers on the problem card and to bring the answer windows of the shield into registry with the answer windows of the cover panel, and a plurality of transparent panels in random order individually selectively fitted to the answer windows of the cover panel having individual answers designated thereon.

9. An educational device comprising a substantially rectangular base panel of sheet material, a first spacer panel superimposed on the base panel and having a channel formed therein, a second spacer panel superimposed on the first spacer panel and having an elongated channel formed therein transversely of the channel in the first spacer panel and a problem window formed therethrough in registration with the channel of said first spacer panel, a third spacer panel superimposed on the second spacer panel having a problem window formed therethrough in registration with the problem window of the second spacer panel and an answer window formed therethrough in registry with the channels in the first and second spacer panels, a cover panel superimposed on the third spacer panel having a problem window formed therethrough in alignment with the problem windows of the second and third spacer panels and an answer window formed therethrough in alignment with the answer window of the third spacer panel and appreciably larger than said answer window in the third spacer panel, a problem card slidably fitted to the channel of the first spacer panel having a problem designated thereon in alignment with the problem windows and an answer to the problem designated thereon in alignment with the answer windows, an opaque answer shield slidably mounted in the channel of the second spacer panel having a window formed therethrough, said shield being reciprocally positionable in its channel between a position with its window in alignment with the answer windows of the panels and the answer on the problem card and a position in concealing relation to the answer on the problem card, and a plurality of transparent answer cards individually removably fitted to the answer windows in the cover panel in covering relation to the answer window in the third spacer panel having random answers individually designated thereon for pupil selection.

10. In an educational device, the combination of a panel having a plurality of sets of answer checking indicia visually represented thereon, each set consisting of a plurality of areas of different colors with the arrangement of the colors being distinctive for each set, an opaque shield, means mounting the shield for reciprocal movement between a position in covering relation to the sets of answer checking indicia and a retracted position and having an answer window therein in registry with each of the sets of checking indicia between which window and checking indicia the shield is reciprocally movable, and a plurality of opaque answer panels individually fitted to the window having individual answer registering indicia visually represented thereon and each being provided with an opening therethrough registrable with a single colored area of a set of answer checking indicia when its panel is fitted into the window, the answer panels each having its opening in a position individual thereto.

11. In an educational device, the combination of a panel having a plurality of sets of answer checking indicia visually represented thereon, each set consisting of a plurality of areas of different colors with the arrangement of the colors being distinctive for each set, an opaque shield, means mounting the shield for reciprocal movement between a position in covering relation to the sets of answer checking indicia and a retracted position and having a single elongated window therein through which the sets of checking indicia are visible and between which window and the checking indicia the shield is movable, and a plurality of answer panels fitted in adjacent relation in the window having indicia visually represented thereon suggestive of a predetermined ordered sequential arrangement of the panels in the window and each panel having an opening therethrough registrable with a single colored area of a respective set of checking indicia when the panels are fitted into the window, the openings being individually distinctively positioned in the answer panels so that when the panels are fitted in the window in the predetermined ordered sequential arrangement all of the openings in the several panels register with the same colored areas in their respective sets of checking indicia.

12. An educational device comprising a holding member having a problem window and an answer window formed therein, a base panel mounted on the holding member having a set of key indicia visible through the problem window and a set of answer checking indicia visible through the answer window, the key set and the checking set each consisting of a plurality of areas of different colors, the areas in the key set being arranged differently from the areas in the checking set, but both sets including areas of the same color, an opaque shield slidably mounted in the mounting member for reciprocal movement between a position in covering relation to the key set and checking set between the windows and the base panel and a position retracted therefrom, a plurality of problem cards individually releasably fitted to the problem window having individual problems visually represented thereon and each having an opening therethrough registrable with a single colored area, the openings in the problem cards being individually positioned in their respective cards so that each card fitted into the problem window reveals a single colored area individual thereto through its opening, and a plurality of answer cards releasably fitted to the answer window having answers corresponding to the problems of the problem cards visually represented thereon and each of the answer cards having an opening formed therethrough registrable with a single colored area in the checking set when the panel is fitted into the answer window, the openings in the problem cards being individually positioned in their respective cards and so coordinated with the positions of the openings in the answer cards and the locations of the colored areas in the key set and checking set that when a problem card is located in the problem window and an answer card located in the answer window bearing an answer appropriate to the problem of the problem card, areas of the same color are visible through the openings of the cards when the shield is retracted.

13. An educational device comprising a panel having a problem window therein and a shield channel adjacent thereto, means visually representing problem indicia in the problem window and answer indicia appropriate thereto in the shield channel, an opaque shield slidably mounted in the shield channel for reciprocal movement between a position in overlaying relation to the answer indicia and a position retracted therefrom, and a plurality of answer indicating means selectively superimposable on the shield in juxtaposition to the answers on the visual representing means through which visual reference can be made to said answers when the shield is retracted.

14. In an educational device of the character described, the combination of visual means having problem indicia and appropriate answer indicia represented thereon, an opaque shield, means mounting the shield for reciprocal movement between a position in covering relation to the answer indicia on the visual means and a retracted position in which an answer window formed therein registers with the answer indicia, means for moving said shield to said alternate position, and a plurality of answer indicating panels having answer indicating indicia represented thereon selectively fitted to the answer window of the mounting means, the answer panels permitting visual reference therethrough to the answer indicia visual means when the shield is retracted.

References Cited in the file of this patent

UNITED STATES PATENTS

| Number | Name | Date |
| --- | --- | --- |
| 1,656,030 | Waring | Jan. 10, 1928 |
| 1,664,842 | Yessler | Apr. 3, 1928 |
| 1,868,823 | Goodrich | July 26, 1932 |
| 2,503,130 | Poritz | Apr. 4, 1950 |